United States Patent [19]

Mizukami

[11] Patent Number: 5,309,074
[45] Date of Patent: May 3, 1994

[54] NUMERICAL CONTROL DEVICE WITH SPEED OVERRIDE CONTROL

[75] Inventor: Yuji Mizukami, Aichi, Japan

[73] Assignee: Mitsubishi Denki Kabushiki Kaisha, Tokyo, Japan

[21] Appl. No.: 21,961

[22] Filed: Feb. 24, 1993

[30] Foreign Application Priority Data

May 18, 1992 [JP] Japan .................. 4-124581

[51] Int. Cl.$^5$ .............................. G05B 11/18
[52] U.S. Cl. .................... 318/571; 318/573; 318/618; 318/616
[58] Field of Search ............... 318/560–646; 364/674.01–674.33

[56] References Cited

U.S. PATENT DOCUMENTS

| | | | |
|---|---|---|---|
| 4,214,823 | 7/1980 | Pritchard | 352/87 |
| 4,262,336 | 4/1981 | Pritchard | 318/573 X |
| 4,449,196 | 5/1984 | Pritchard | 364/768 |
| 4,652,804 | 3/1987 | Kawamura et al. | 318/573 X |
| 4,894,596 | 1/1990 | Hara | 318/571 X |
| 4,912,385 | 3/1990 | Kawamura et al. | 318/571 X |
| 4,941,104 | 7/1990 | Teshima et al. | 318/569 X |
| 5,004,968 | 4/1991 | Mizuno et al. | 318/615 |
| 5,132,912 | 7/1992 | Ito et al. | 318/571 X |
| 5,194,793 | 3/1993 | Niimi | 318/568.15 |

FOREIGN PATENT DOCUMENTS 2-48101  2/1990  Japan .
2-58106  2/1990  Japan .

Primary Examiner—Paul Ip
Attorney, Agent, or Firm—Sughrue, Mion, Zinn, Macpeak & Seas

[57] ABSTRACT

A multi-system numerical control device which receives input commands for each system and is operative to control the speed and acceleration/deceleration of corresponding moveable objects, such as a motors. Each system has an interpolation unit and an acceleration/deceleration unit that is responsive to a corresponding time constant. A speed override device is operative to generate a speed reduction control signal that is applied to the interpolation unit to reduce the speed and to the acceleration/deceleration unit to reduce the time constant, thereby ensuring that the position relationship between the systems will not be lost even when override is applied.

19 Claims, 18 Drawing Sheets

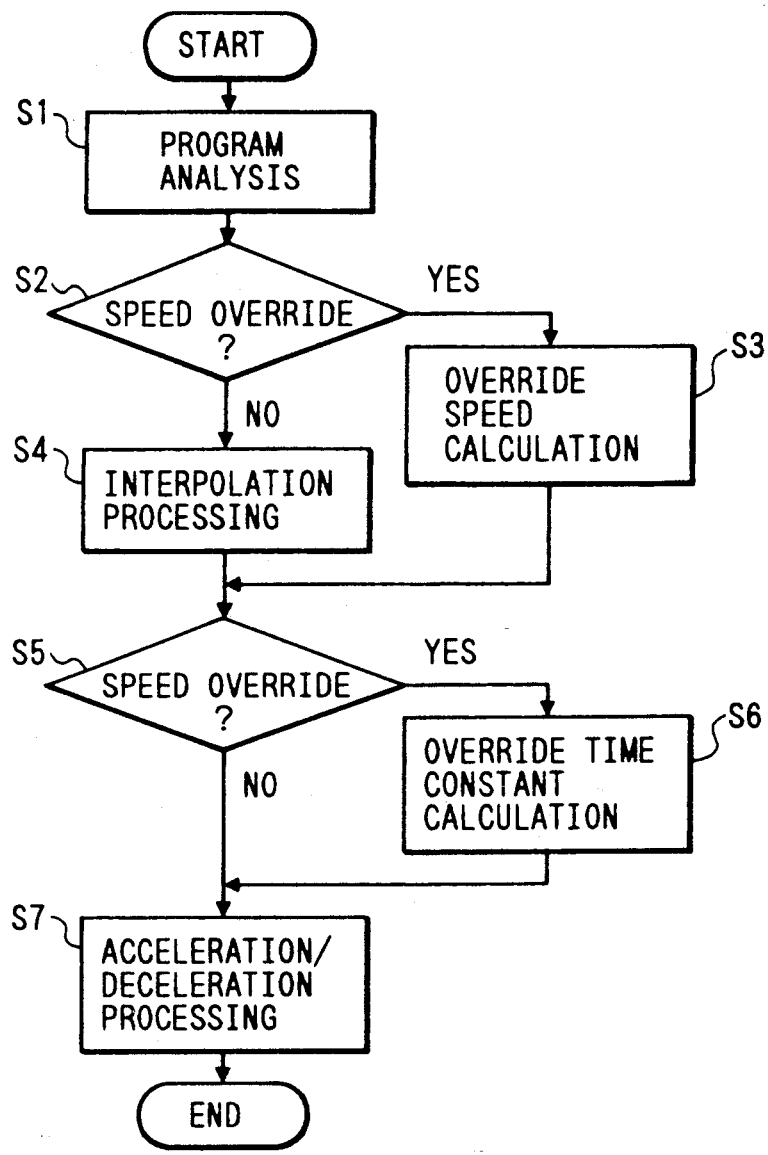

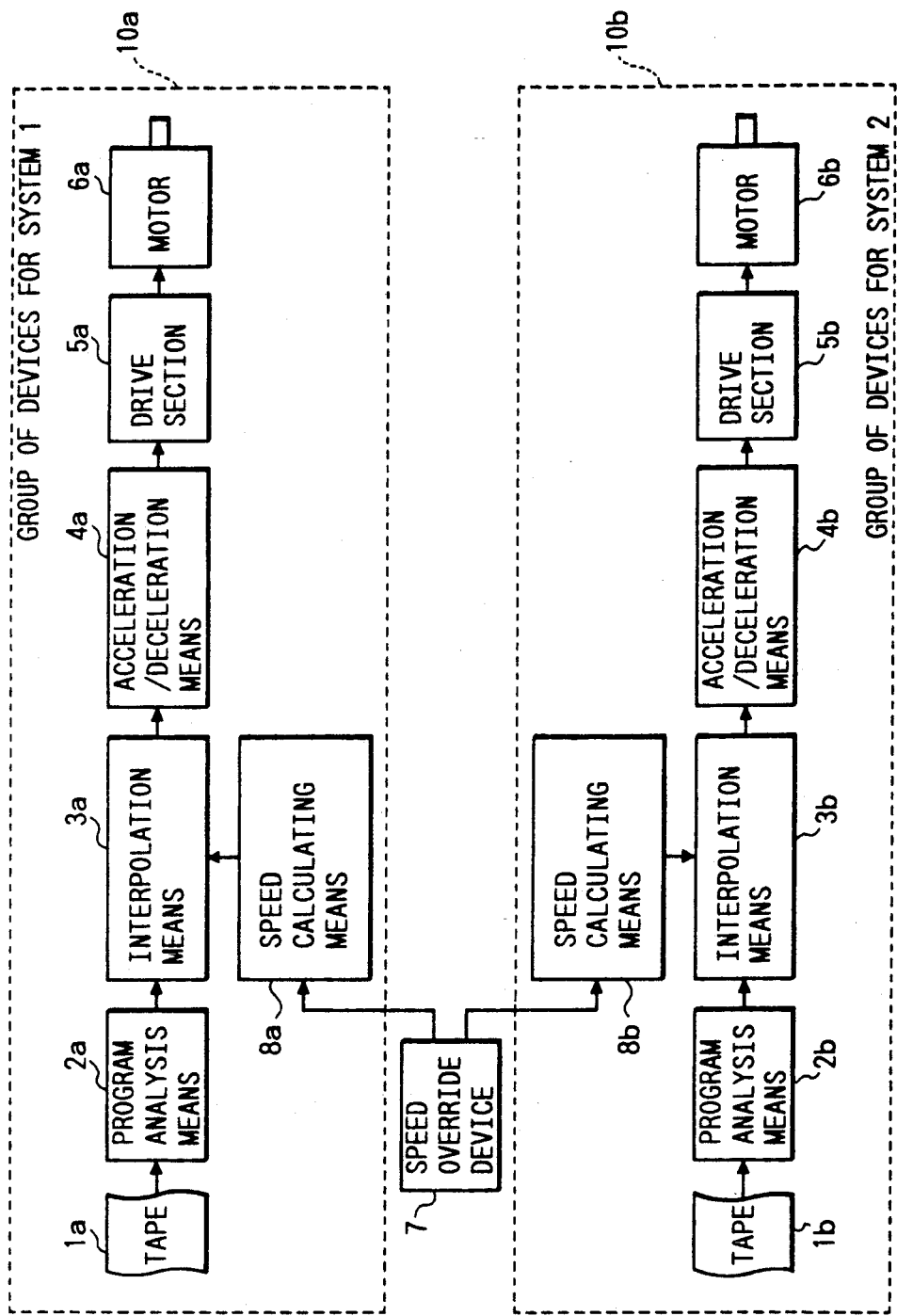

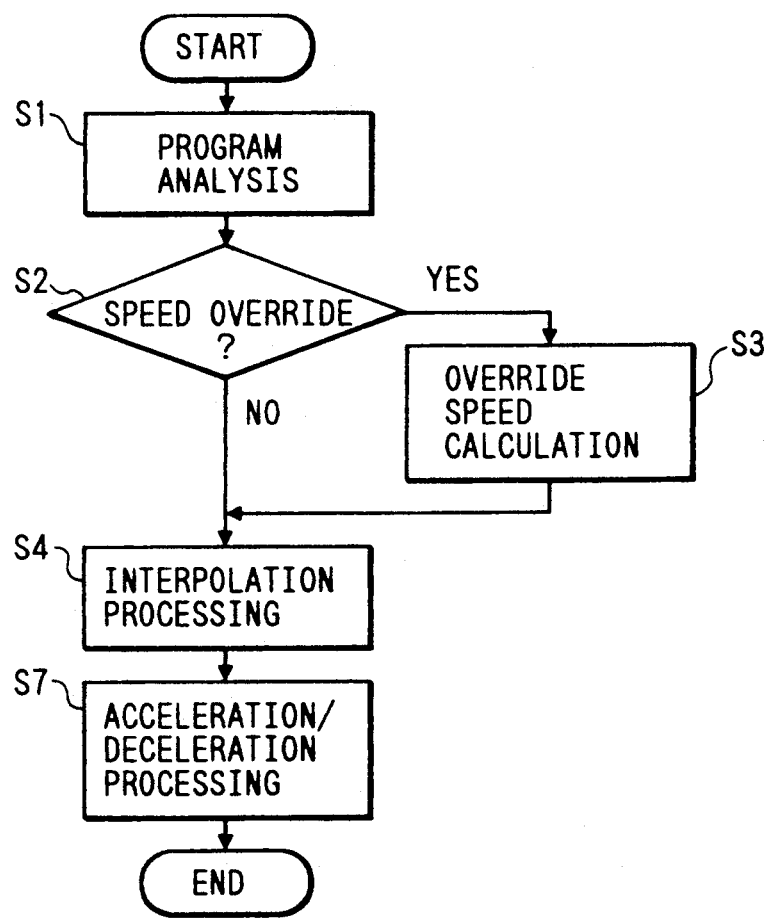

NUMERICAL CONTROL DEVICE WITH SPEED OVERRIDE CONTROL

BACKGROUND OF THE INVENTION

1. Field of the Invention

This invention concerns a numerical control device, particularly a numerical control device for multi-system-controlled machine tools, which is capable of maintaining a relationship among particular positions in the systems even when speed override is applied, thereby safeguarding against interaction between machines.

2. Description of the Background Art

FIG. 6A is a block diagram which illustrates the composition of a multi-system numerical control device. In this figure, 1a and 1b represent the tape, 2a and 2b the program analysis means, 3a and 3b the interpolation means, 4a and 4b the acceleration/deceleration means, 5a and 5b the drive section, 6a and 6b the motor, 7 the speed override device, and 8a and 8b the speed calculating means. The acceleration/deceleration means 4a and 4b may have a design as disclosed in U.S. Pat. No. 4,554,497, or similar designs known in the art. In the same figure, 10a represents the group of devices for system 1 comprising 1a, 2a, 3a, 4a, 5a, 6a and 8a while 10b represents the group of devices for system 2 comprising 1b, 2b, 3b, 4b, 5b, 6b and 8b.

The operation of these parts is now described briefly using FIG. 6B, which is a flowchart which shows the acceleration/deceleration processing operations known in the art. First, at step S1 punched tapes 1a and 1b containing the machining program in NC language are analyzed by program analysis means 2a and 2b, and at step S2 it is determined as to whether there is a speed override command from speed override device 7. If it is determined that there is a speed override command, the speed with the speed override applied is calculated by speed calculating means 8a and 8b at step S3, and at step S4 interpolation processing is provided by interpolation means 3a and 3b. If it is determined at step S3 that there is no speed override command, the interpolation processing is provided as is at step S4. Based on the data yielded by the interpolation processing, at step S7 the acceleration/deceleration is provided by acceleration/deceleration means 4a and 4b for a prescribed period of time, and thus motors 6a and 6b are driven and controlled through drive sections 5a and 5b, respectively. The machine's time constant common to all the systems is determined in line with the system having the highest time constant.

FIGS. 7A and 7B comprise a series of graphs showing the acceleration/deceleration patterns created by acceleration/deceleration means 4a and 4b, and in these graphs the vertical axis represents the transfer rate and the horizontal axis the time. In FIG. 7A, graph 71a shows the acceleration/deceleration pattern when speed override is not applied to axis X1 of system 1, with "F" denoting the feedrate, "J" the time constant, "T01" the transfer time, and "L1" the transfer distance. In FIG. 7B, graph 72a shows the acceleration/deceleration pattern when speed override is not applied to the X2 axis of system 2, with "F" denoting the feedrate, "J" the time constant, "T02" the transfer time, and "L2" the transfer distance. When speed override is not applied, transfer finish time "T01" of system 1 is represented by formula (1) given below, and transfer finish time "T02" of system 2 is represented by formula (2) given below. These formulae apply when the speed and time constants of the first and second systems are equal.

$$T01 = L1/F + J \quad (1)$$

$$T02 = L2/F + J \quad (2)$$

FIG. 8A is a graph showing the relationship between the positions of axis X1 in system 1 and axis X2 in system 2 with an acceleration/deceleration pattern such as that in graphs 71a and 72b of FIGS. 7A and 7B. The vertical axis represents the position and the horizontal axis the time. 81a indicates axis X1 in system 1, and 82a axis X2 in system 2. When, for instance, axis X1 is at position A1 at time T01, axis X2 will be at position A2 at the same moment.

In order to reduce the time for machining work to the minimum and enhance efficiency of the machining, programs are prepared to move the machines in each system with minimal waste in movement and to avoid machines coming into contact with each other by properly arranging the timings between the systems concerned. To ascertain whether a program actually produces the intended movements, work is cut on a trial basis, and adjustments are then made to the program. However, if the machines are made to move at the actual machining speeds, these speeds are so fast that it is hard to check the movements. Furthermore, due to the high speed of the machines, mistakes made in the program stand the risk of resulting in contact between machines or tool breakage.

This is why programs are normally checked by applying speed override to slow down the machine speeds. At slower speeds, it becomes possible to stop the machines in time if it appears that the machines will collide, and also to visually check their movements easily because they are moving slowly. Speed override is applied in such cases with conventional multi-system numerical control devices. As an example of this feature, a speed override of 50% is applied to the acceleration/deceleration pattern shown in graphs 71a and 72a of FIGS. 7A and 7B. The override is applied only to the speed, i.e., the height of the current on the vertical axis is changed as is the length of the wave along the time axis, but it does not affect the acceleration (angle of increase) or deceleration (angle of decrease) of the wave. The resulting finish times TN1 for system 1 and TN2 for system 2 are represented by formulae (3) and (4), respectively; and the resulting acceleration/deceleration patterns are shown in 71b of FIG. 7C for axis X1 of system 1 and in 72b of FIG. 7D for axis X2 of system 2.

$$TN1 = 2L1/F + J \quad (3)$$

$$TN2 = 2L2/F + J \quad (4)$$

FIG. 8B is a graph showing the relationship between the positions of axes X1 and X2 of systems 1 and 2 when the override in 71b and 72b of FIGS. 7C and 7D has been applied. The vertical axis represents the position and the horizontal axis the time; 81b shows axis X1 of system 1 and 82b axis X2 of system 2. When axis X1 is at position A1 at time TN1, axis X2 is in actual fact at position B2 although it should be at position A2. Thus, the relationship between the positions in the systems is lost.

Considered next is an instance where the speeds are different. FIGS. 9A-9D comprise a series of graphs showing the acceleration/deceleration patterns created by acceleration/deceleration means 4a and 4b, and in these graphs the vertical axis represents the transfer rate and the horizontal axis represents the time. In FIG. 9A, graph 91a shows the acceleration/deceleration pattern when speed override is not applied in system 1, with "F1" denoting the feedrate, "J" the time constant, "T01" the transfer time, and "L1" the transfer distance. In FIG. 9B, graph 92a shows the acceleration/deceleration pattern when speed override is not applied in system 2 which has a different speed from system 1, with "F2" denoting the feedrate, "J" the time constant, "T02" the transfer time, and "L2" the transfer distance. When speed override is not applied, transfer finish time "T01" of system 1 is represented by formula (5) given below, and transfer finish time "T02" of system 2 is represented by formula (6) given below. FIG. 10A is a graph showing the relationship between the positions of axis X1 in system 1 and axis X2 in system 2 with an acceleration/deceleration pattern such as that in graphs 91a and 92a of FIGS. 9A and 9B. The vertical axis represents the position and the horizontal axis the time. 101a indicates axis X1 in system 1, and 102a axis X2 in system 2. When, for instance, axis X1 is at position A1 at time TN1, axis X2 will be at position A2.

$$T01 = L1/F1 + J \tag{5}$$

$$T02 = L2/F2 + J \tag{6}$$

As an example of a difficulty that may arise with the conventional case, consider now a situation in which the speed override (R) is 50%. Graph 91b of FIG. 9C shows the acceleration/deceleration pattern that results when a 50% (normally $0 \leq R \leq 1$) speed override is applied to the above-mentioned numerical control device system 1; graph 92b of FIG. 9D shows the acceleration/deceleration pattern applying when a 50% speed override is applied to the above-mentioned numerical control device system 2. Transfer finish time "TN1" of system 1 is represented by formula (7) given below, and transfer finish time "TN2" of system 2 is represented by formula (8) given below. FIG. 10B is a graph showing the relationship between the positions of axis X1 in system 1 and axis X2 in system 2 when override as shown in graphs 91b and 92b in FIGS. 9C and 9D is applied. The vertical axis represents the position and the horizontal axis the time. 101b indicates axis X1 in system 1, and 102a axis X2 in system 2. When axis X1 is at position A1 at time TN1, axis X2 is in actual fact at position B2 although it should be at position A2, and the relationship between the positions in the systems is thus lost.

$$TN1 = 2L1/F + J1 = 2T01 - J1 \tag{7}$$

$$TN2 = 2L2/F + J2 = 2T02 - J2 \tag{8}$$

The time constants of a machine are calculated in accordance with the capacity and characteristics of that machine, and the lowest possible time constants within the allowable range are used. In a conventional multi-system numerical control device such as that described above, the time constant of the system with the highest time constant among all the systems was used as the time constant common to all the systems. However, in order to further reduce the machining time and raise efficiency, it is better to use the lowest time constant for each system rather than one time constant which is common to all the systems.

FIGS. 11A-11D comprise a series of graphs showing the acceleration/deceleration patterns created by acceleration/deceleration means 4a and 4b, and the time constants differ for systems 1 and 2. In these graphs, the vertical axis represents the transfer rate and the horizontal axis represents the time. In FIG. 11A, graph 111a shows the acceleration/deceleration pattern when speed override is not applied in system 1, with "F" denoting the feedrate, "J1" the time constant, "T01" the transfer time, and "L1" the transfer distance. Note that the feed ratio for both axis is the same. In FIG. 11B, graph 112a shows the acceleration/deceleration pattern when speed override is not applied in system 2 with a different time constant from that of system 1, with "F" denoting the feedrate, "J2" the time constant, "T02" the transfer time, and "L2" the transfer distance. Again the feed ratio for both axis is the same. When speed override is not applied, transfer finish time "T01" of system 1 is represented by formula (9) given below, and transfer finish time "T02" of system 2 is represented by formula (10) given below.

$$T01 = L/F + J1 \tag{9}$$

$$T02 = L/F + J2 \tag{10}$$

FIG. 12A is a graph showing the relationship between the positions of axis X1 in system 1 and axis X2 in system 2 with an acceleration/deceleration pattern such as that in graphs 111a and 112a of FIGS. 11A and 11B. The vertical axis represents the position and the horizontal axis the time. 121a indicates axis X1 in system 1, and 122a indicates axis X2 in system 2. When, for instance, axis X1 is at position A1 at time T01, axis X2 will be at position A2.

As an example of a difficulty arising in the conventional case, consider now a situation where the speed override is 50%. Graph 112b of FIG. 11C shows the acceleration/deceleration pattern applying when a 50% (normally $0 \leq R \leq 1$) speed override is applied to the above-mentioned numerical control device system 1. Graph 111b of FIG. 11D shows the acceleration/deceleration pattern applying when a 50% speed override is applied to the above-mentioned numerical control device system 2. Transfer finish time "TN1" of system 1 is represented by formula (11) given below, and transfer finish time "TN2" of system 2 is represented by formula (12) given below.

$$TN1 = 2L1/F + J1 = 2T01 - J1 \tag{11}$$

$$TN2 = 2L2/F + J2 = 2T02 - J2 \tag{12}$$

FIG. 12B is a graph showing the relationship between the positions of axis X1 in system 1 and axis X2 in system 2 when override as shown in graphs 111b and 112b in FIGS. 11C and 11D is applied. The vertical axis represents the position and the horizontal axis represents the time. 121b indicates axis X1 in system 1, and 122b indicates axis X2 in system 2. When axis X1 is at position A1 at time TN1, axis X2 is in actual fact at position B2 although it should be at position A2. Thus, the relationship between the positions in the systems is lost.

Indicated below are the problems which arise when the relationship between the positions in the systems is lost, as mentioned above.

Consider the multi-system lathe such as that shown in FIG. 13. In the figure, 131 and 133 represent the tool rests, 132 and 134 the cutting tools mounted on tool rests 131 and 133, respectively, 135 the work, and 136 the spindle that turns work 135. Tool rest 131 is moved along the X1 axis, and tool rest 133 along the X2 axis. Spindle 136 moves along the Z1 axis. System 1 is composed of tool rest 131 and spindle 136; system 2 is composed of tool rest 133 and spindle 136. 137 is the coordinate system of system 1 and system 2 the coordinate system of 138. The operations of the machine are now described using the two illustrations of FIG. 14A and 14B.

In these figures, as shown in FIG. 14A, tool rest 131 moves along the X1 axis of system 1, and work 135 is cut as far as X11 along the system 1 X1 axis by moving spindle 136 along the Z1 axis. Next, as shown in FIG. 14B, in order to save the time for synchronization, systems 1 and 2 are efficiently moved, and as soon as the cutting of the work is finished, tool rest 133 is moved as far as X11 along the system 2 X2 axis, and the work is machined as far as X21. A case where the relationship between the positions in the systems is lost by applying speed override in a multi-system lathe such as the one described above will now be outlined using the two illustrations of FIG. 15A and 15B.

Originally, tool rest 133 should move as far as X11 along the system 2 X2 axis after having cut as far as X11 along the system 1 X1 axis in FIG. 15A. However, by applying speed override, the synchronization between the systems is lost and, regardless of the fact that cutter 131 of system 1 is still cutting work 135 which has not been cut as far as X11, tool rest 133 of system 2 is about to move as far as X11 along system 2 axis X2. As a result, tool rest 133 and work 135 make contact, as shown in FIG. 15B, and there is a risk that the tool will break.

In this way, therefore, when speed override is applied to a conventional multi-system numerical control device, if the axis transfer rates differ between systems and/or if the acceleration/deceleration means have different time constants for each system, the position relationship between the systems will be lost, and problems will arise in the risk of tool breakages or contact between machines.

SUMMARY OF THE INVENTION

It is an object of the present invention to solve these problems.

In particular, it is an object of the present invention to provide a multi-system numerical control device which has acceleration/deceleration means that can provide different time constants for each system, and thereby ensure that the position- relationship between the systems will not be lost even when override is applied.

It is a further object of the invention to provide a multi-system numerical control device which has a time constant calculating means for calculating the acceleration/deceleration time constants in proportion to the commanded speed override.

It is yet another object of the present invention to provide a multi-system numerical control device which has time constants adjusted for each system so that positional relationships between the systems are not lost, even when the axis transfer rates differ between systems.

BRIEF DESCRIPTION OF THE DRAWINGS

FIG. 2 is a flowchart illustrating the operations of the numerical control device incorporating the present invention.

FIG. 6A is a block diagram of a conventional numerical control device.

FIG. 6B is a flowchart illustrating the operations of a conventional numerical control device.

DESCRIPTION OF THE PREFERRED EMBODIMENTS

As an example of the implementation of the present invention, reference is made to FIGS. 1-4 and the description thereof provided below, wherein reference to conventional components are made by the use of the same reference numbers used to describe the conventional art.

Figure 1:
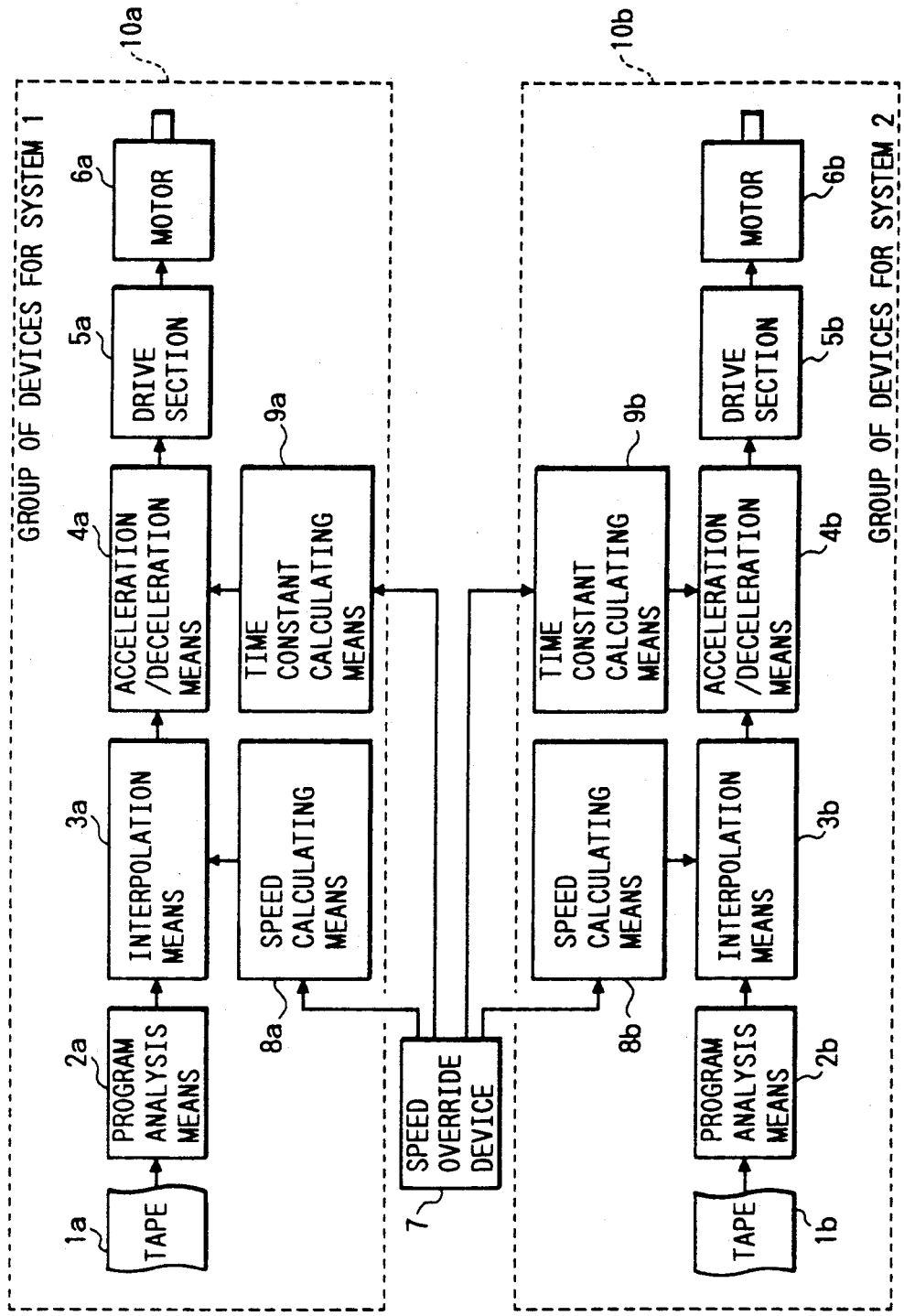
FIG. 1 is a block diagram of the numerical control device related to an example of the present invention.

FIG. 1 is a block diagram of a multi-system numerical control device produced through implementation of this invention. In this figure, 1a and 1b represent the tape, 2a and 2b the program analysis means, 3a and 3b the interpolation means, 4a and 4b the acceleration/deceleration means, 5a and 5b the drive section, 6a and 6b the motor, 7 the speed override device, 8a and 8b the speed calculating means, and 9a and 9b respectively represent the time constant calculating means which calculate the acceleration/deceleration time constants in proportion to the speed override in response to the speed override commands. 10a represents the group of devices for system 1 comprising 1a, 2a, 3a, 4a, 5a, 6a and 8a while 10b represents the group of devices for system 2 comprising 1b, 2b, 3b, 4b, 5b, 6b and 8b.

The operation of the numerical control device indicated in FIG. 1 is now described using FIG. 2, which is a flowchart showing the acceleration/deceleration processing operations when the time constant calculating means is added. First, at step S1 punched tapes 1a and 1b containing the machining program in NC language are analyzed by program analysis means 2a and 2b, at step S2 it is determined as to whether there is a speed override command from speed override device 7. If it is determined that a speed override command for slowing the machine speed is present, at step S3 the speed with the speed override applied is calculated by speed calculating means 8a and 8b, and at step S4 interpolation processing is provided by interpolation means 3a and 3b. If it is determined at step S3 that there is no speed override command, the interpolation processing at step S4 is provided as is. The processing up to this point, namely the processing from steps S1 to S4, is the same as that in the example of a conventional numerical control device.

Next, at step S5 it is determined for the second time as to whether there is a speed override command. If there is such a command, in step S6 the acceleration/deceleration time constants for maintaining the synchronization relationship in proportion to the speed override are calculated by time constant calculating means 9a and 9b. Then, in step S7, acceleration/deceleration is provided by acceleration/deceleration means 4a and 4b. It should be apparent that there is a need for a determination of the speed override command only one time, with the conduct of both of steps S3 and S4 resulting therefrom.

If there is no speed override command, the initial acceleration/deceleration time constants are used and, in step S7, acceleration/deceleration is provided by acceleration/deceleration means 4a and 4b as before.

Assume that, in time constant calculating means 9a and 9b, the initially set time constant for system 1 is "J01," the initially set time constant of system 2 is "J02," the time constants of systems 1 and 2 calculated by time constant calculating means 9a and 9b as "JN1" and "JN2," respectively, and the speed override as Rx100%. Then, time constant "JN1" of system 1 will be arithmetically processed as in formula (13) given below by the time constant calculating means, and similarly time constant "JN2" of system 2 will be arithmetically processed as in formula (14) given below, and they will be used as the acceleration/deceleration time constants of the systems.

$$JN1 = J01R \tag{13}$$

$$JN2 = J02R \tag{14}$$

By re-calculating the time constants as described above, the position relationship between the systems can be maintained even if speed override is applied. FIGS. 3A–3D and 4A–4B will now be used to describe how it is possible to maintain the position relationship between the systems even if speed override is applied.

Figure 3A:
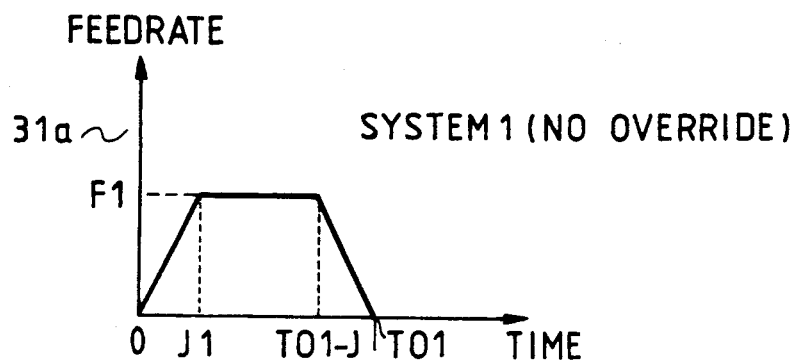
FIGS. 3A-3D show the acceleration/deceleration patterns created by the acceleration/deceleration means of the present invention.
Figure 3B:
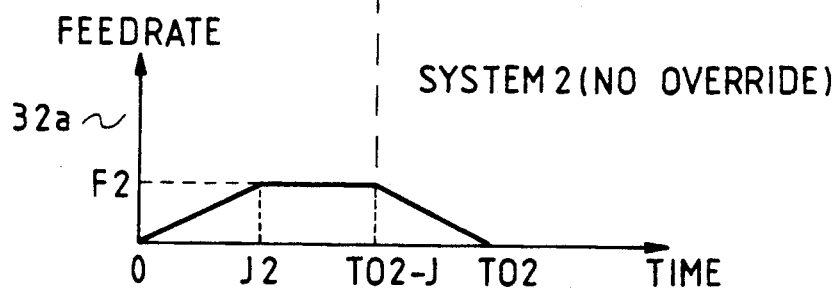

FIGS. 3A–3D comprise a series of graphs showing the acceleration/deceleration patterns created by acceleration/deceleration means 4a and 4b, and in these graphs the vertical axis represents the transfer rate and the horizontal axis represents the time. Graph 31a shows the acceleration/deceleration pattern for system 1 when speed override is not applied, with "F1" denoting the feedrate, "J1" the time constant, "T01" the transfer time, and "L1" the transfer distance. In FIG. 3B, graph 32a shows the acceleration/deceleration pattern for system 2 with a different time constant from that of system 1 when speed override is not applied, with "F2" denoting the feedrate, "J2" the time constant, "T02" the transfer time, and "L2" the transfer distance. When speed override is not applied, transfer finish time "T01" of system 1 is represented by formula (15) given below, and transfer finish time "T02" of system 2 is represented by formula (16) given below.

Figure 4A:
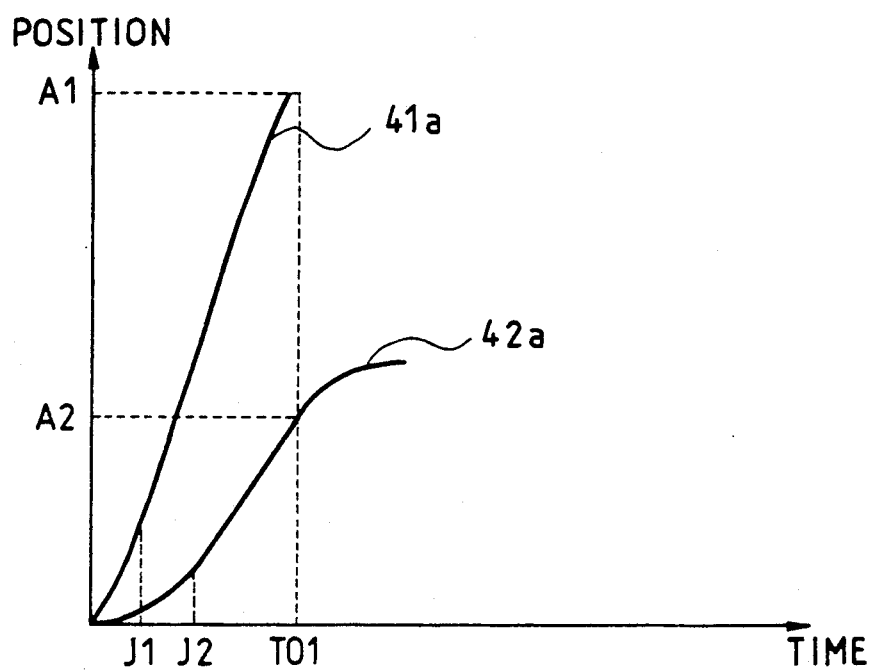
FIGS. 4A and 4B show the times and positions of the axes for a machine with the acceleration/deceleration patterns shown in FIGS. 3A-3D.

FIG. 4A is a graph showing the relationship between the positions of axis X1 in system 1 and axis X2 in system 2 with an acceleration/deceleration pattern such as that in graphs 31a and 32a of FIGS. 3A and 3B when speed override is not applied. The vertical axis represents the position and the horizontal axis represents the time. 41a indicates axis X1 in system 1, and 42a axis X2 in system 2. When axis X1 is at position A1 at time T01, axis X2 will be at position A2.

$$T01 = L1/F1 + J1 = Te1 \tag{15}$$

$$T02 = L2/F2 + J2 = Te2 \tag{16}$$

Figure 3C:
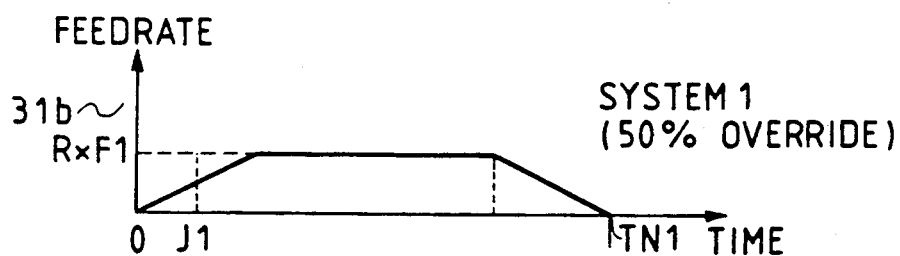
Figure 3D:
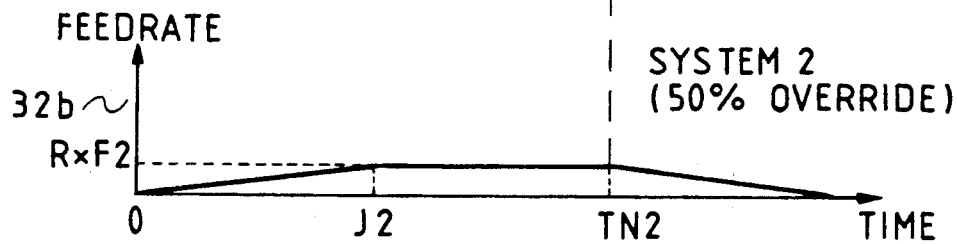
Figure 4B:
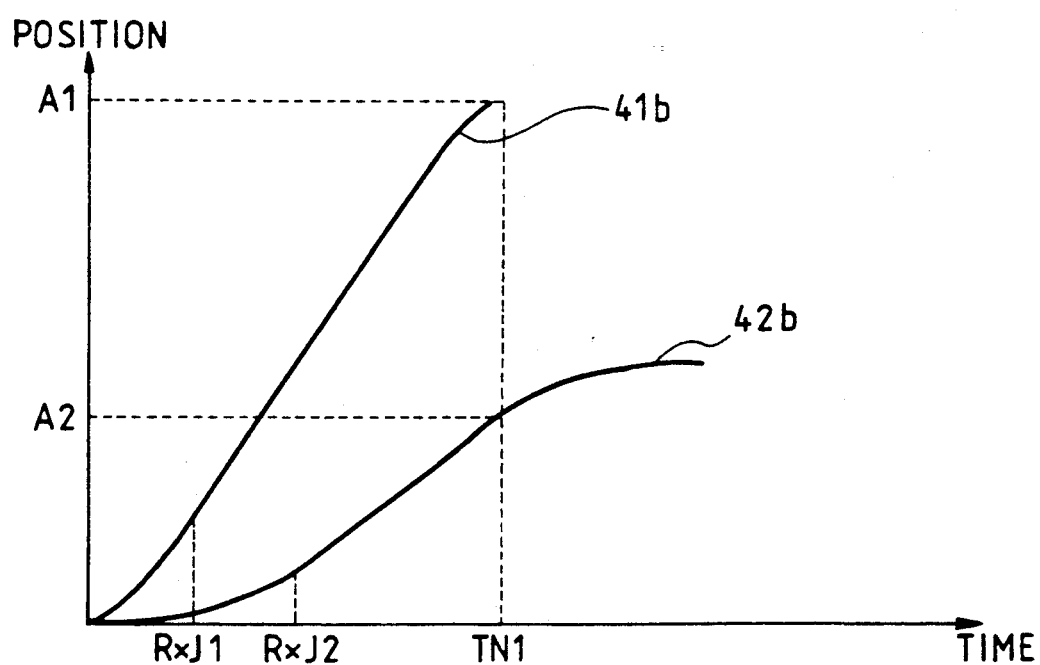

Referring to FIGS. 3C and 3D, graphs 31b and 32b represent the acceleration/deceleration patterns when an Rx100% speed override is applied to systems 1 and 2 of the numerical control device described above. Transfer finish time "TN1" of system 1 is represented by formula (17) given below, and transfer finish time "TN2" of system 2 is represented by formula (18) given below. FIG. 4B is a graph showing the relationship between the positions of axis X1 in system 1 and axis X2 in system 2 with the acceleration/deceleration patterns such as those in graphs 31b and 32b of FIGS. 3C and 3D. The vertical axis represents the position and the horizontal axis represents the time. 41b indicates axis X1 in system 1, and 42b indicates axis X2 in system 2. When axis X1 is at position A1 at time TN1, axis X2 will be at position A2. This is to say that the position relationship between the systems is maintained, whether or not speed override is applied.

$$TN1 = L1/(RxF1) + J1/R = (L1/F1 + J1)/R = T01/R \tag{17}$$

$$TN2 = L2/(RxF2) + J2/R = (L2/F2 + J2)/R = T02/R \tag{18}$$

Various arrangements may be considered for the acceleration/deceleration processing means 4a, 4b which perform acceleration/deceleration processing using an acceleration/deceleration time constant calculated by the time constant calculating means 9a, 9b. For example, the one as shown in FIG. 5A may be employed.

These acceleration/deceleration processing means 4a, 4b are compatible with the override values of 100%, 50%, 25% and 10%, and the present embodiment allows the time constant to be changed to 25 msec, 50 msec, 100 msec and 250 msec, respectively, at the Numerical Control system sampling period of 5 msec.

Figure 5A:
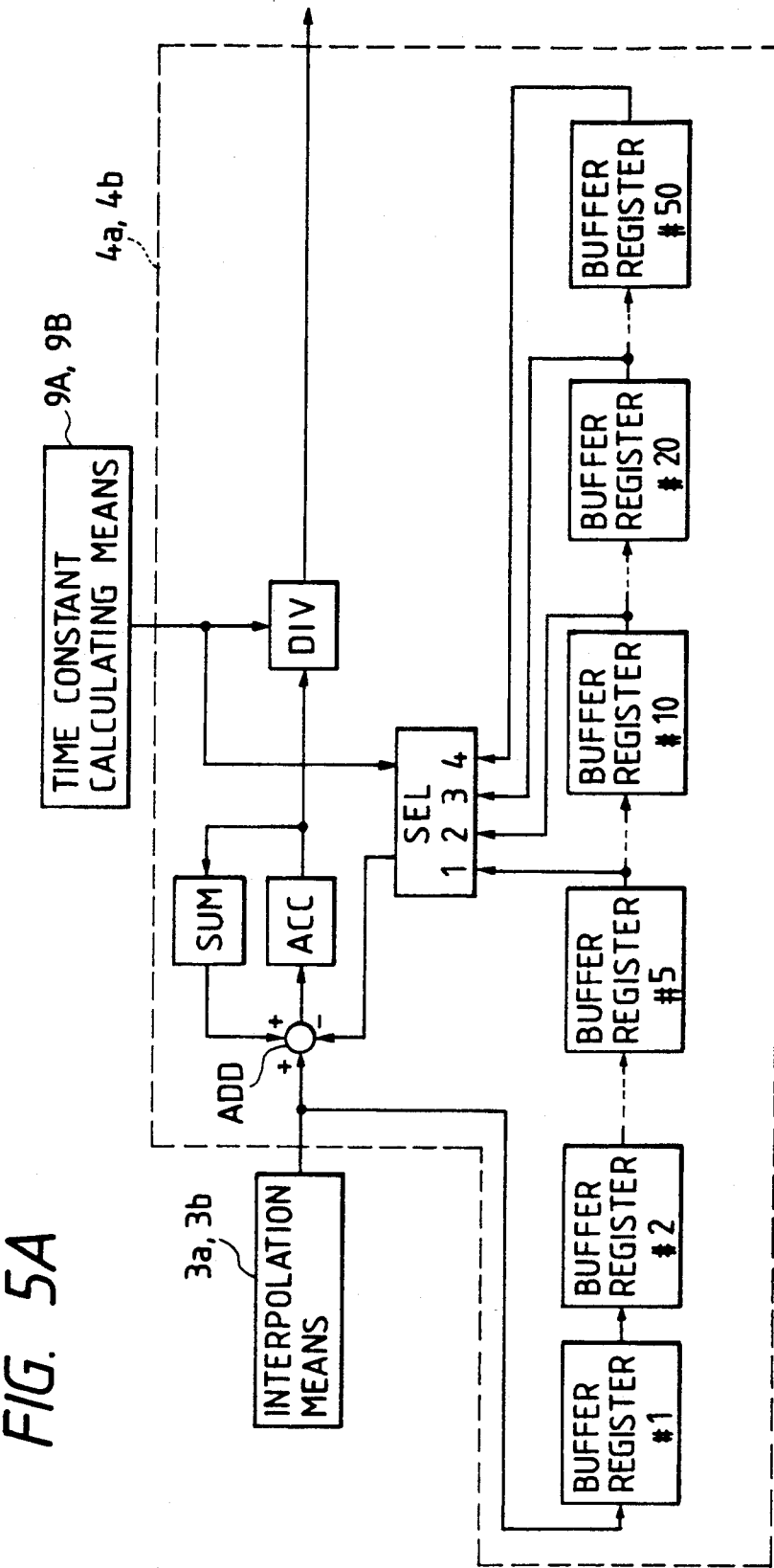
FIG. 5A illustrates an arrangement for the acceleration/deceleration processing means as used in the preferred embodiment.

Namely, as shown in FIG. 5A, the interpolation means 3a, 3b generate interpolation data $\Delta Xn$ per sampling as an axis drive signal and provides it to the acceleration/deceleration processing means 4a, 4b. The acceleration/deceleration register which contains D buffer registers, where D is equal to $\tau/T$ and $\tau$ is the time constant and T is the sampling period of the NC. In the present embodiment, D equals 50 because the time constant can be changed to any of 25 msec, 50 msec, 100 msec and 250 msec at the NC's sampling period of 5 msec. Thus, there are buffer registers #1, #2 ... #49 and #50, a known selector SEL which selects any of buffer registers #5, #10, #20 and #50 that provides the output of the shift register according to the acceleration/deceleration time constant calculated by the time constant calculating means 9a, 9b, an adder circuit ADD, an accumulator ACC which temporarily stores an addition result, a register SUM to which the addition result is transferred, and a divider DIV which divides the addition result by D. (D is the number of buffer registers selected by the selector SEL, e.g. D=5 when buffer register #5 has been selected by the selector SEL to provide output. In the present embodiment, any of 5, 10, 20, and 50 is set.) With buffer registers #1 to #50 connected in series, the most recent interpolation data $\Delta Xn$ is stored into buffer register #1 per sampling, the content of each buffer register is transferred to the next buffer register, the content $\Delta Xn$ of any buffer register selected by the selector SEL according to the override value is input to the adder ADD, and the number of buffer registers selected by the selector SEL is set to the divider DIV.

Figure 5B:
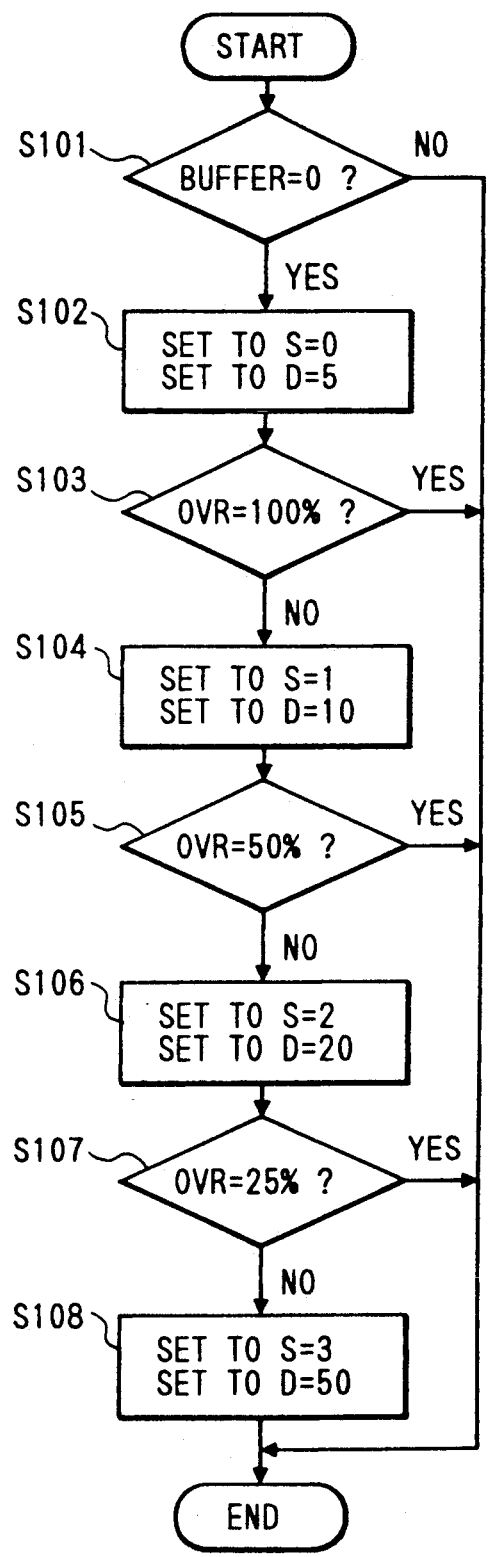
FIG. 5B is a flowchart illustrating the process of setting the variables for the processing means of FIG. 5A.

Since the present embodiment allows the time constant to be changed to any of 25 msec (for the override value of 100%), 50 msec (for the override of 50%), 100 msec (for the override value of 25%) and 250 msec (for the override value of 10%) at the NC's sampling period of 5 msec, the selector SEL and divider DIV are set as indicated in FIG. 5B according to the override value.

Referring to FIG. 5B, first it is determined whether the content of the buffer is "0" or not at step 101. If it is not "0", the previous override value is used. If it is "0", the processing proceeds to step 102, wherein "0" is set to the selector SEL (to select the output of buffer register #5) and "5" is set to the divider DIV. It is then determined at step 103 whether the override value is 100% or not. If it is 100%, processing is terminated. If it is not 100%, the processing progresses to step 104, wherein "1" is set to the selector SEL (to select the output of buffer register #10) and "10" is set to the divider DIV. It is then determined at step 105 whether the override value is 50% or not. If it is 50%, processing is terminated. If it is not 50%, the processing advances to step 106, wherein "2" is set to the selector SEL (to select the output of buffer register #20) and "20" is set to the divider DIV. It is then determined at step 107 whether the override value is 25% or not. If it is 25%, processing is terminated. If it is not 25%, the processing moves on to step 108, wherein "3" is set to the selector SEL (to select the output of buffer register #50) and "50" is set to the divider DIV.

At a certain sampling point, therefore, the adder ADD performs the following operation, supposing that St is the content of the register SUM, $$\Delta Xn - \Delta Xo + St \rightarrow St \qquad (19)$$

and stores the operation result into the accumulator ACC. The content of the accumulator ACC is divided by D by the divider DIV and input to pulse distributing means (not shown). At the same time, the content of each buffer register (#1 to #50) is shifted to the next buffer register, $\Delta Xn$ is stored into the first buffer register #1, and further the content St of the accumulator ACC is transferred to the register SUM.

Figure 5C:
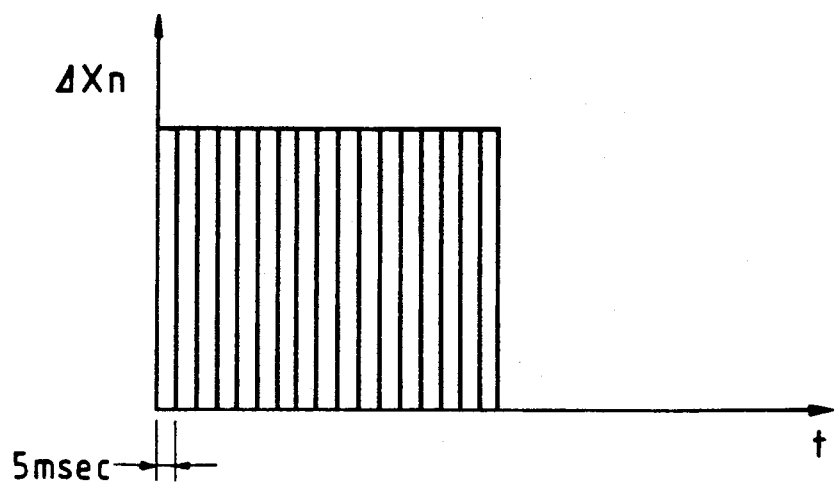
FIGS. 5C and 5D illustrate samplings relevant to the processing means of FIG. 5A.
Figure 5D:
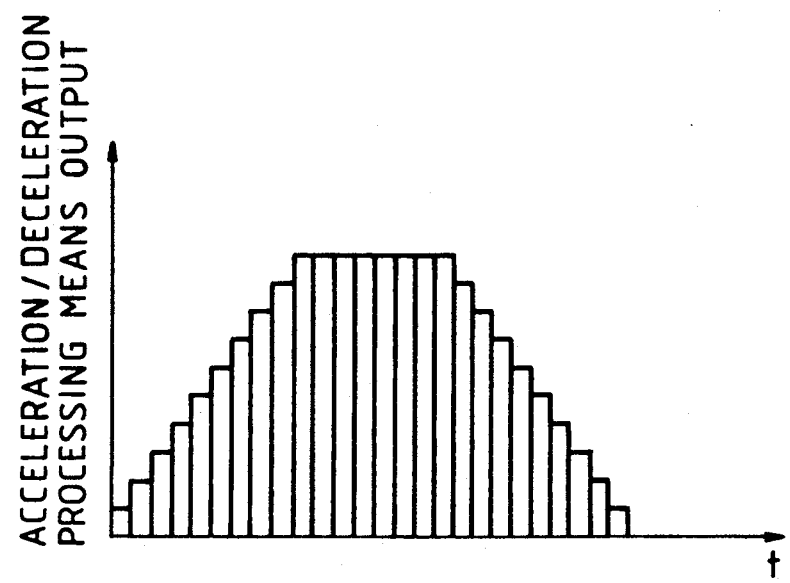
Figure 7A:
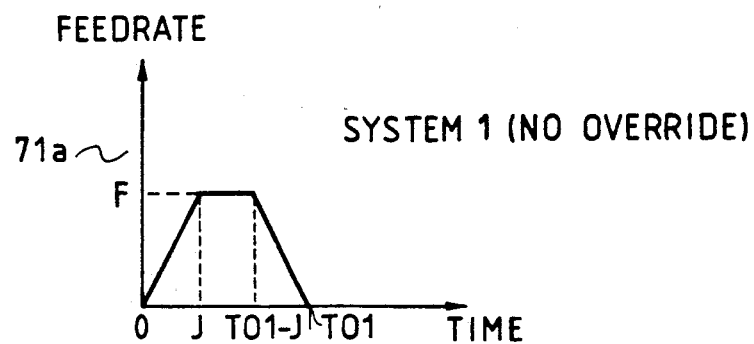
FIGS. 7A-7D show the acceleration/deceleration patterns which are created by conventional acceleration/deceleration means with time constants and feedrates which are identical for both systems.
Figure 7B:
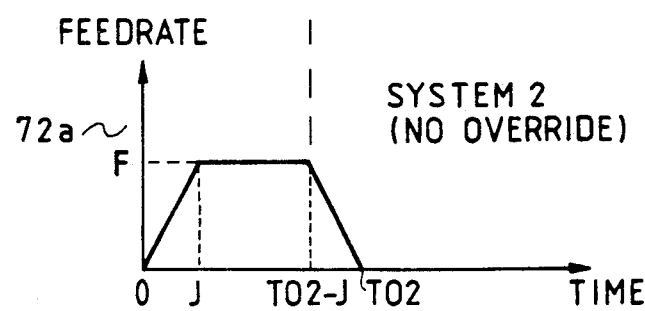
Figure 7C:
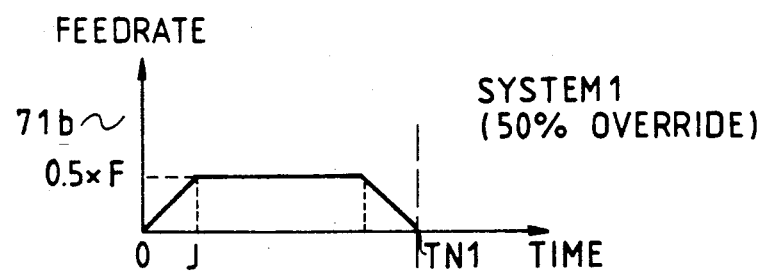
Figure 7D:
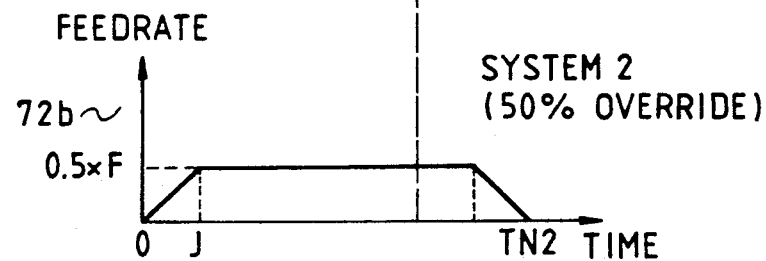
Figure 8A:
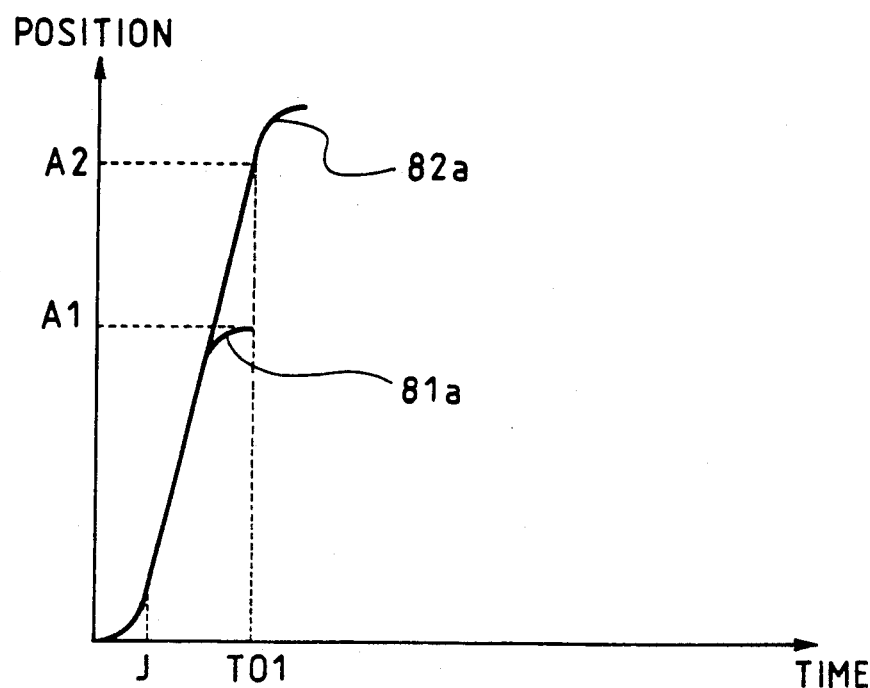
FIGS. 8A and 8B show the times and positions of the axes for a machine having the acceleration/deceleration patterns shown in FIGS. 7A-7D.
Figure 8B:
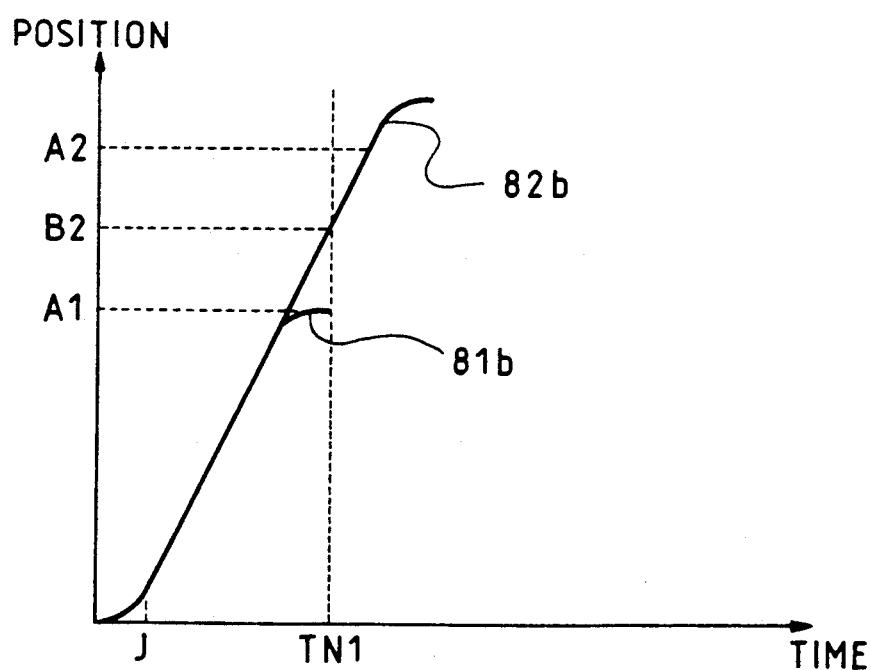
Figure 9A:
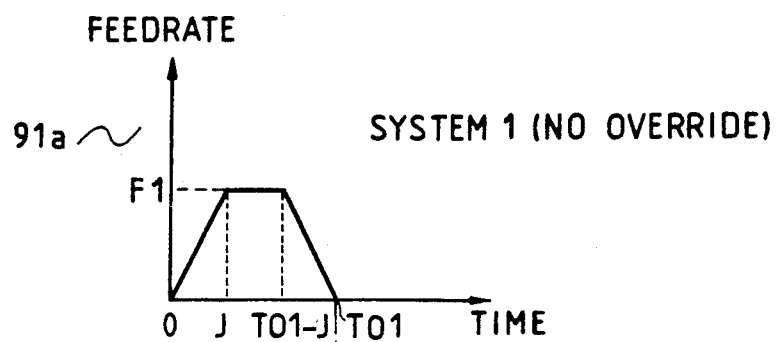
FIGS. 9A-9D show the acceleration/deceleration patterns which are created by conventional acceleration/deceleration means with different speeds but identical acceleration/deceleration time constants for each system.
Figure 9B:
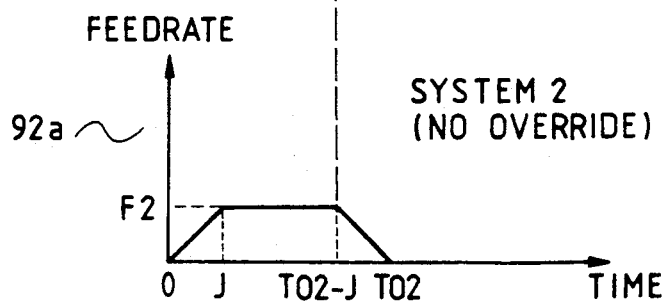
Figure 9C:
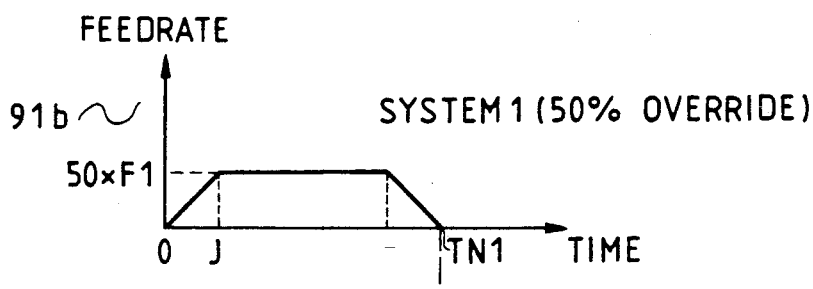
Figure 9D:
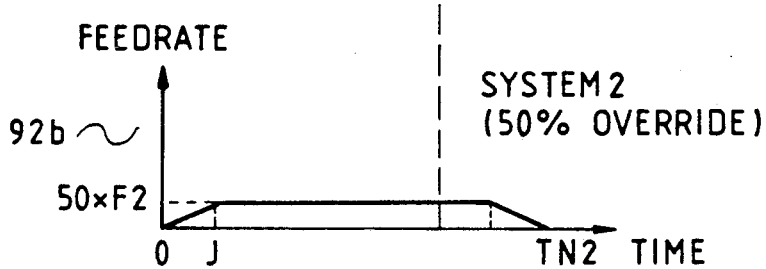
Figure 10A:
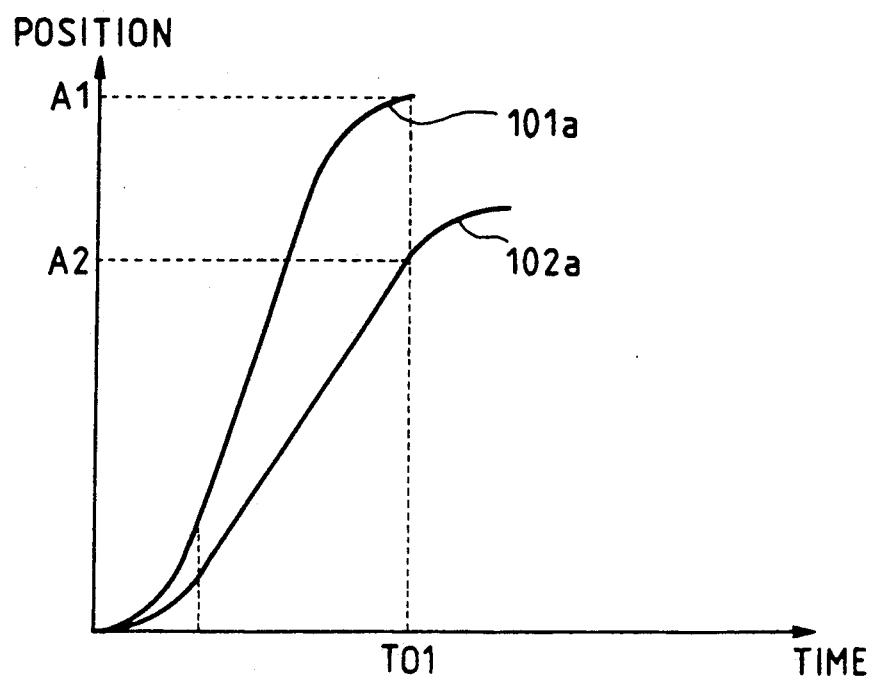
FIGS. 10A and 10B show the times and positions of the axes for a machine having the acceleration/deceleration patterns shown in FIGS. 9A-9D.
Figure 10B:
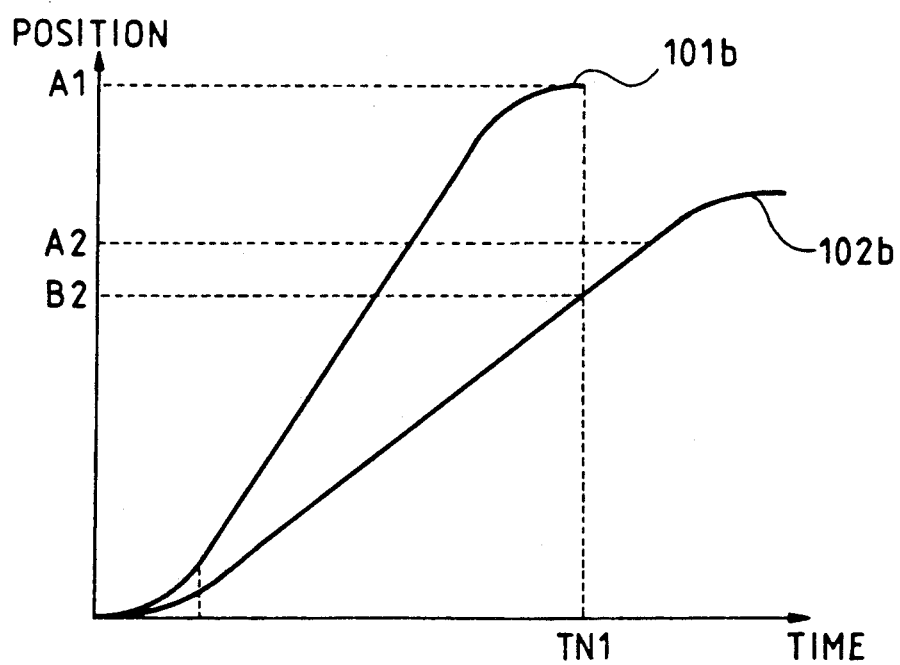
Figure 11A:
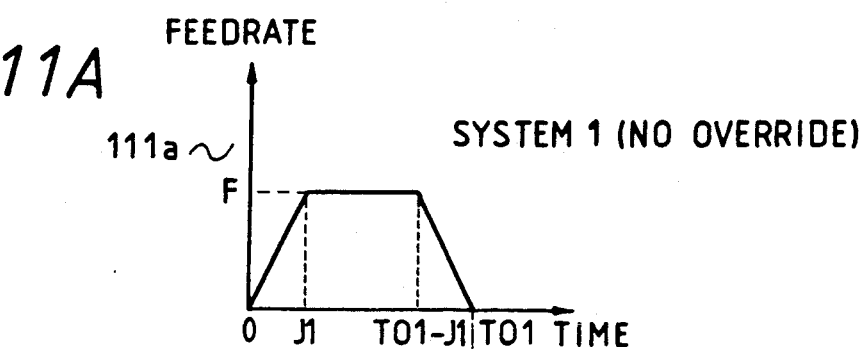
FIGS. 11A-11D show the acceleration/deceleration patterns which are created by conventional acceleration/deceleration means with different acceleration/deceleration time constants but identical speeds for each system.
Figure 11B:
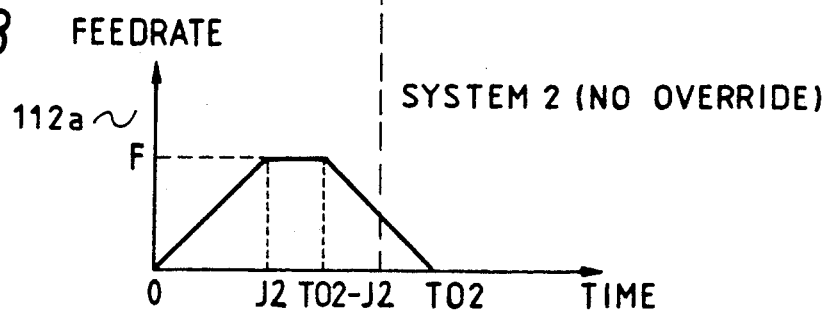
Figure 11C:
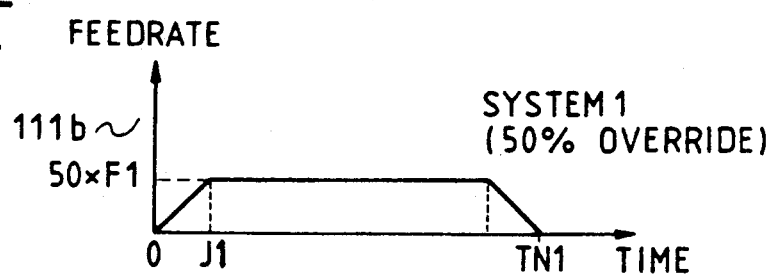
Figure 11D:
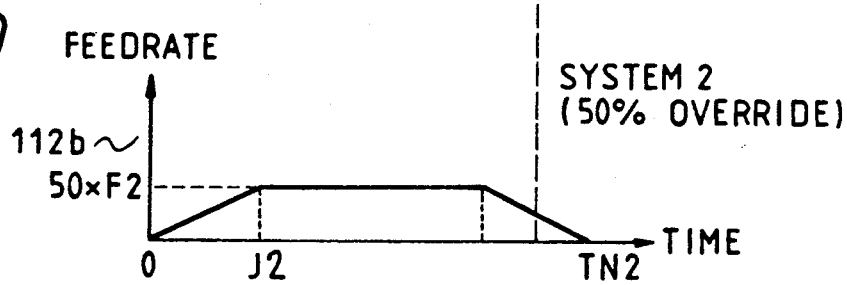
Figure 12A:
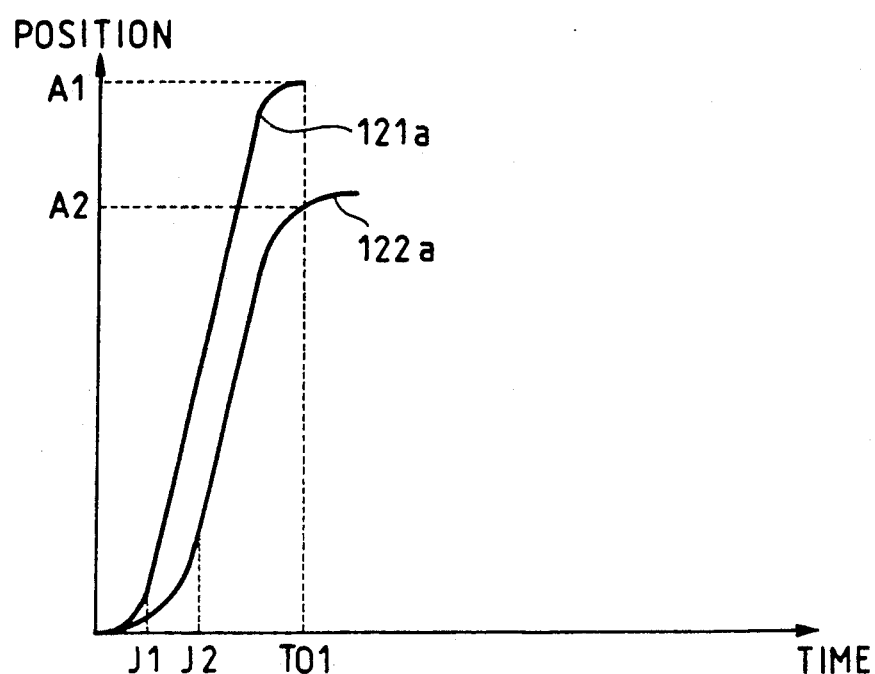
FIGS. 12A and 12B show the times and positions of the axes for a machine with the acceleration/deceleration patterns shown in FIGS. 10A and 10B.
Figure 12B:
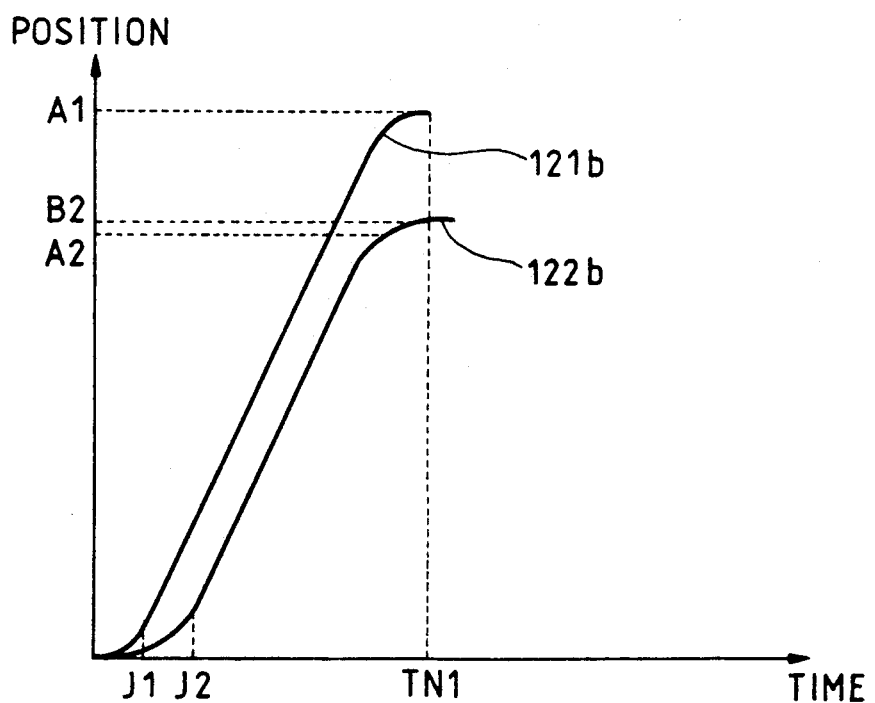
Figure 13:
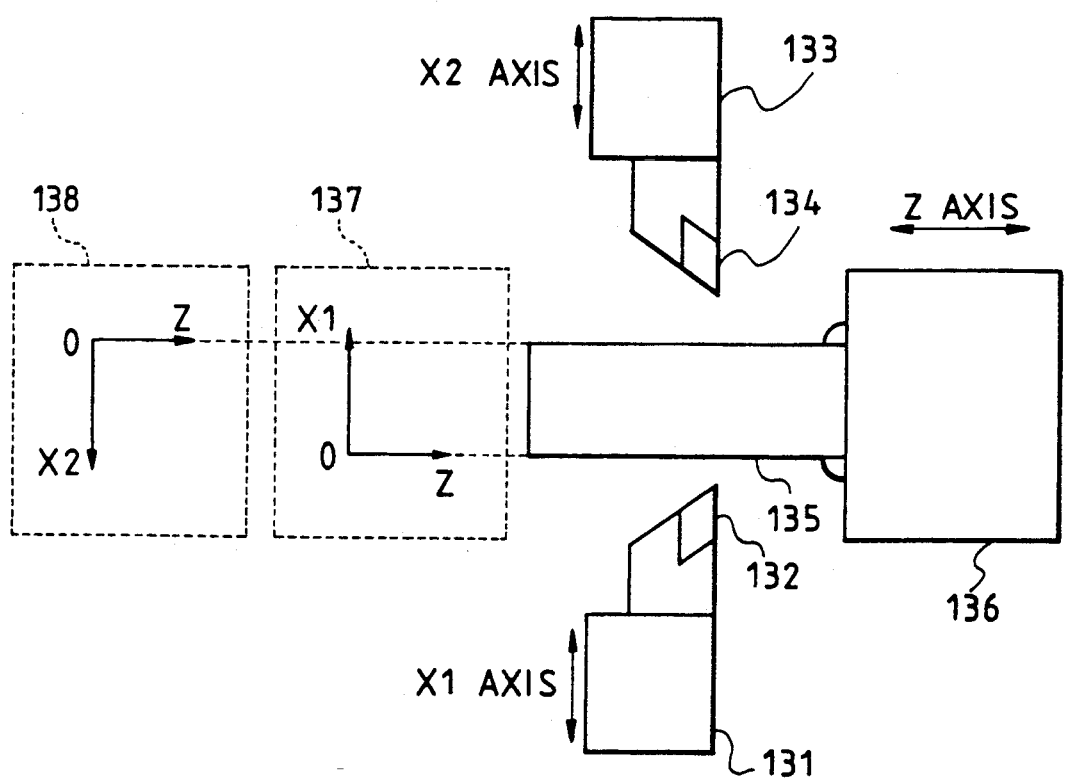
FIG. 13 shows an example of a multi-system machine tool.
Figure 14A:
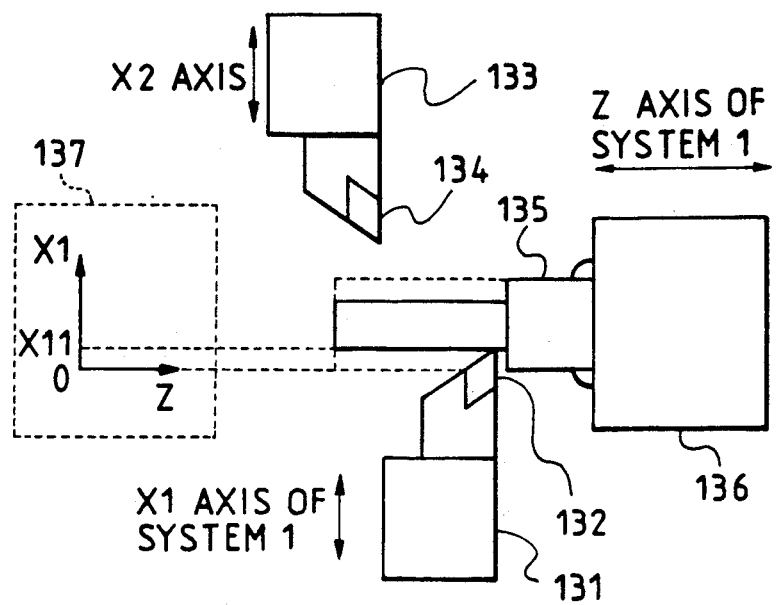
FIGS. 14A and 14B describe the operations of a multi-system machine tool, an example of which is shown in FIGS. 8A and 8B.
Figure 14B:
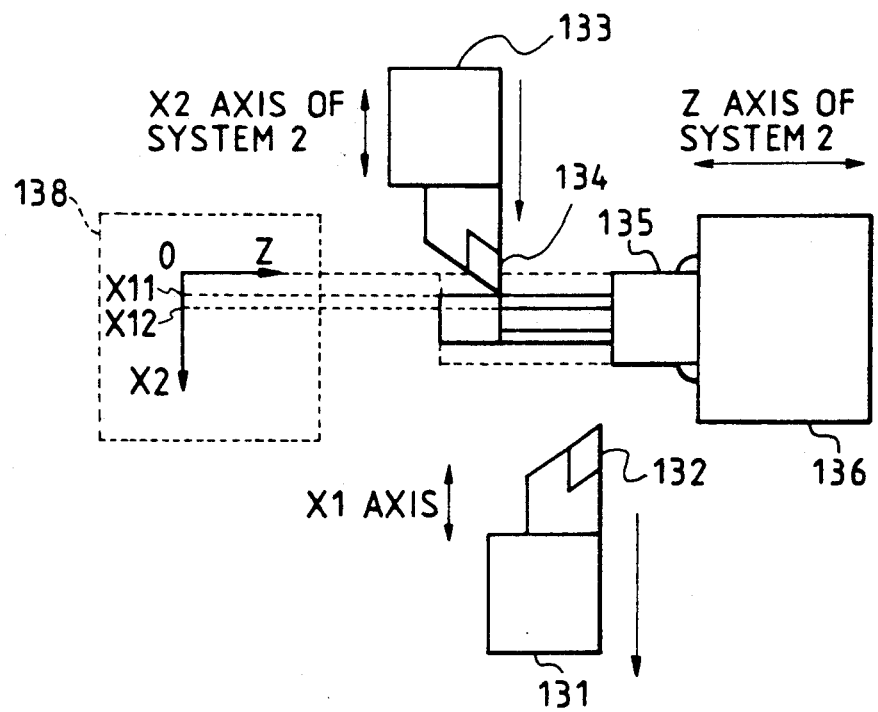
Figure 15A:
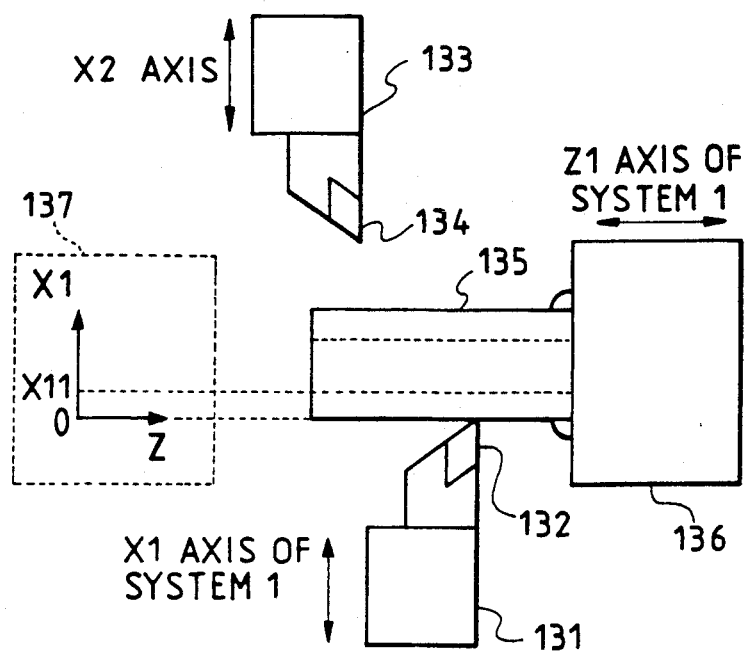
FIGS. 15A and 15B describe the operations when the synchronization relationship is lost in a multi-system machine tool, an example of which is shown in FIGS. 8A and 8B.
Figure 15B:
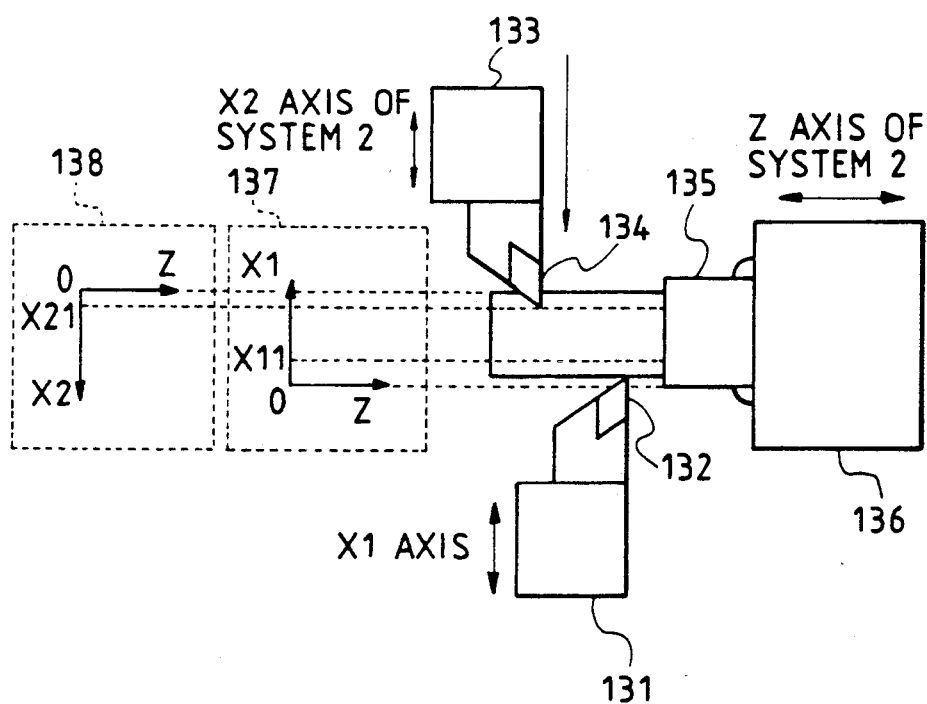

A specific example of FIG. 5A will now be described with reference to FIGS. 5C and 5D. It is assumed that the time constant is 50 msec (override 50%) and the NC's sampling period T is 5 msec. Hence, "1" is set to the selector SEL to provide the 10th (=50/5) buffer register output. It is also assumed that input $\Delta Xn$ to the acceleration/deceleration processing means 4a, 4b is 10 and the initial values of buffer registers #1 to #10 m accumulator ACC and register SUM are "0". At the first sampling time of day, the operation result St of expression (19) is 10 because $\Delta Xn=10$, $\Delta Xo=0$ and the content of the register SUM=0, and therefore the divider DIV output is 1. At the second sampling time of day, the operation result St of expression (19) is 20 because $\Delta Xn=10$, $\Delta Xo=0$ and the content of the register SUM=10, and therefore the divider DIV output is 2. Similarly, the dividing output is incremented to 3, 4, ... 10. After the time constant or 50 msec has elapsed, input $\Delta Xn$ (=10) to the acceleration/deceleration processing means 4a, 4b matches the output of the acceleration/deceleration processing means 4a, 4b, and thereafter a predetermined value of 10 is output from said acceleration/deceleration processing means 4a, 4b until $\Delta Xn$ is not input. When the input of $\Delta Xn$ ends, the operation result St of expression (15) is 90 because $\Delta Xn=0$, $\Delta Xo=10$ and the content of SUM=100, and the divider DIV output is 9. In the similar manner, thereafter it is decremented to 8, 7, ... 1, 0 and finally to "0" in time constant 50 msec.

While the preferred embodiment was described for linear acceleration/deceleration, the present invention is also applicable to exponential acceleration/deceleration. In addition, whereas acceleration/deceleration processing was performed after interpolation in said embodiment, the present invention is also applicable to where interpolation is performed after acceleration/deceleration processing.

As described above, the use of this invention in a multi-system numerical control device with acceleration/deceleration means using different time constants makes it possible to maintain the relationship between the positions in the systems even when speed override is applied and thus to safeguard against interaction between the machines of the systems. In cases where the transfer rates or transfer times between the systems differ, it makes it possible to maintain the relationship between the positions in the systems even when speed override is applied.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A numerical control device for a machine tool comprising:
    a plurality of controlled systems, the operation of at least a first and second of said systems being synchronized and being represented by respective acceleration/deceleration time constants;
    a speed override input for inputting a speed override command;
    an interpolation processor for reading a machining program and outputting resultant drive signals;
    a time-constant processor that modifies said respective acceleration/deceleration time constants for said first and second systems in response to said speed override command and in accordance with a predetermined functional relationship, and that outputs acceleration and deceleration control signals based on the modified time constants and the drive signals;
    wherein said functional relationship substantially maintains the synchronized operation of said first and second systems.

2. A numerical control device for a machine tool as set forth in claim 1, wherein said time-constant processor calculates said respective modified time constants for said first and second systems in proportion to said speed override.

3. A numerical control device for a machine tool as set forth in claim 2, wherein said time constant processor calculates said respective modified time constants in response to the same speed override factor.

4. A numerical control device for a machine tool as set forth in claim 1, wherein said respective modified time constants are different.

5. A numerical control device for a machine tool comprising:
    at least a first and a second controlled system, each comprising a moveable part and being responsive to input commands;
    means for providing a speed override to at least said first and said second controlled systems;
    speed calculating means, responsive to said speed override means, for producing a speed signal for controlling the speed of each said moveable part; and
    acceleration/deceleration means for providing acceleration and deceleration control signals for said first and second controlled systems for respective prescribed periods of time, said acceleration/deceleration means being responsive to said speed override means for modifying said prescribed periods of time in predetermined functional relationship to said provided speed override;
    wherein said functional relationship substantially maintains a positional relationship between said movable parts.

6. The numerical control device as set forth in claim 5, further comprising time constant calculating means responsive to said speed override means for modifying original time constants representative of said prescribed periods of time.

7. A numerical control device as set forth in claim 6, wherein said functional relationship is defined by:

$$JN = JO/R$$

where
    JO is one of said original time constants,
    R is said speed override, and
    JN is a modified time constant.

8. The numerical control device as set forth in claim 6, wherein said time constant calculating means outputs said modified time constants, and
    said acceleration/deceleration means inputs said modified time constants in order to modify said prescribed period of time.

9. The numerical control device as set forth in claim 5, wherein a respective acceleration/deceleration time constant is predetermined for each said system.

10. The numerical control device as set forth in claim 5, wherein said acceleration/deceleration means is operative according to a linear function.

11. The numerical control device as set forth in claim 5, wherein said acceleration/deceleration means is operative according to an exponential function.

12. The numerical control device as set forth in claim 5, wherein said provided speed override slows the speed of each said moveable part.

13. The numerical control device as set forth in claim 5, wherein said acceleration/deceleration means comprises:
    a shift register having a plurality of buffer registers;
    a selector for selecting among said plurality of buffer registers to provide a shift-register output, wherein the selection is determined by said provided speed override; and
    processing means responsive to a drive signal, to said shift register output and to said provided speed override for providing said acceleration and deceleration control signals.

14. The method of controlling a plurality of systems in a numeral control device, each said system having a corresponding acceleration/deceleration time constant, in response to input control signals, comprising:
    generating respective speed control signals for each said system in response to said input control signals and at least one speed override command; and
    modifying each said time constant, in response to said speed override command, according to a predetermined functional relationship which substantially maintains a positional relationship between controlled portions of said systems.

15. The method of controlling a plurality of systems in a numerical control device, as set forth in claim 14, further comprising detecting said override command within said input control signals.

16. The method of controlling a plurality of systems in a numerical control device, as set forth in claim 14, wherein said modifying step comprises re-calculating said acceleration/deceleration time constants in proportion to the speed override factor determined in response to said speed override command.

17. The method of controlling a plurality of systems in a numerical control device, as set forth in claim 16, wherein said functional relationship is defined by:

$$JN=JO/R$$

where
- JO is one of said acceleration/deceleration time constant,
- R is said speed override factor, and
- JN is a modified time constant.

18. A multi-line numerical control method for numerically controlling independent lines individually under control of independent machining programs, each said line having a respective acceleration/deceleration time constant and being operative to operate a motor, comprising the steps of:
   (a) analyzing each of said machining programs to identify a commanded feedrate for a corresponding line;
   (b) in response to said analysis, overriding each feedrate commanded by said each machining program analyzed at step (a) to provide respective override values;
   (c) calculating a modified corresponding acceleration/deceleration time constant to maintain positional relationships between the lines according to each override value at step (b); and
   (d) exercising acceleration/deceleration control of the motor on each line using each modified acceleration/deceleration time constant calculated at step (c).

19. A multi-line numerical control apparatus for numerically controlling independent lines individually under control of independent machining programs, each said line having a respective acceleration/deceleration time constant and being operative to operate a motor, comprising:
   (a) program analyzing means for analyzing each of said machining programs to identify a commanded feedrate for each said motor;
   (b) an overriding device for overriding each feedrate commanded by said each machining program analyzed by said program analyzing means;
   (c) acceleration/deceleration time constant calculating means for calculating a modified acceleration/deceleration time constant for each said line in order to maintain positional relationships between the lines according to each override value of said overriding device; and
   (d) accelerating/deceleration means for exercising the acceleration/deceleration control of a motor on each line using each modified acceleration/deceleration time constant calculated by said acceleration/deceleration time constant calculating means.

* * * * *